March 9, 1948. J. E. MULLEN 2,437,436

METHOD FOR MAKING PLASTIC CONTACT LENSES

Filed Dec. 15, 1947

INVENTOR:
JOHN E. MULLEN
by Dike, Calver & Porter,
Attys.

Patented Mar. 9, 1948

2,437,436

UNITED STATES PATENT OFFICE

2,437,436

METHOD FOR MAKING PLASTIC CONTACT LENSES

John E. Mullen, Cambridge, Mass.

Application December 15, 1947, Serial No. 791,851

6 Claims. (Cl. 51—284)

The present invention relates to a method for making, finishing or changing plastic contact lenses, and particularly to the operations of cutting, grinding and lapping the corneal portions thereof.

In making plastic contact lenses or changing their power, the outer corneal surface is formed or reformed by rotating the lens and cutting a required curvature of some specific radius thereon. In subsequent operations, the lens is lapped, ground and polished while similarly rotating the lens. For a considerable period of time, it has been the practice to rotate the lens by means of a mount which holds the lens and which is held by the means for rotating the lens. A lens may not be handled or worked in a lathe or other machine producing rotation in the same way as metal, wood, plastics and other material which may be machined while held by a chuck. This necessitates the use of the so-called "mount" which is in itself rigid and which will also serve to maintain the contour and shape of the lens during the various operations to which it is subjected.

In the following description, it will be understood that a plastic contact lens of Plexiglass or the like is a thin flexible, transparent, concavo-convex article of relatively small dimensions which if held by means of the usual form of chucks used in workshop practice, would become distorted, and accurate corneal curvature required for proper refraction could not be produced or maintained. Furthermore, a contact lens of this form does not present any suitable exposed surfaces or edges upon which a chuck could obtain a suitable purchase or hold. A mount of a substantially different form must therefore be used in manipulating or rotating the lens. The surface of the mount is coated with pitch or other suitable adhesive material which may be applied in a thin film, and to which the lens may adhere without producing distortions in carrying out the cutting, polishing and other operations to which the lens is subjected. The adhesive serves as a buffer medium or supporting medium between the lens and supporting surface of similar curvature on which the lens is mounted. By the use of a rigid curved mount or support having its supporting surface coated with a strong adhesive in a thin layer having the required body, the contact lens and the mount surface may be securely held in contact with each other, assuring rigidity of the contact lens and solid support therefor during the operations to be carried out. Attempts have also been made to use suction for causing contact lenses to adhere to a mount surface, but this method is not generally used and is not entirely satisfactory because a slight distortion of the contact lens takes place, and after the operations are carried out and the suction or tension on the lens is released, the lens reverts to its former configuration in the surface which was supported, and the outer surface or opposite surface is correspondingly flexed, producing a discrepancy in refraction in the completed lens. But it now appears that when the supporting surfaces of the mount are substantially geometrical in form the use of suction as a means of adhesion is satisfactory, and it is to be understood that in the use of the word "adhesion," it is intended to refer to and apply to both the use of suction and the use of adhesive material in connection with the mount for holding the contact lens in place during the various operations carried out on it.

The various operations to be carried out on the front corneal surface of the contact lens, including cutting, grinding, machining, lapping and polishing, are for the purpose of giving the corneal lens a desired power, or the required power as may be prescribed by a physician or an optometrist. In general, every contact lens has to be made up to a different power and the curvature to which the front corneal surface must be made to give the required power is calculated in advance of the operations on the lens. The lens is then mounted in such a position that when the mount is held in the chuck or spindle of a lathe, or other machine employed in carrying out any of the various operations, it will turn on the axis of the corneal part, i. e., the axis along which one looks through the lens. After the lens has been "turned" or machined to the calculated amount to provide the desired front curvature, it is necessary to remove from the surface the "turning" or "machine" marks which give it a "frosted" appearance. This is accomplished by lapping the surface with a concave tool having the same curvature in the negative as that of the convex lens surface operated upon. After removing the machine marks, the lens surface is polished. The polishing operation to which the lens is now subjected is carried out by rotating the lens in contact with fine emery paper, for example, or rouge, or other suitable polishing medium, and being rubbed and polished, and further lapped, if necessary, with a polishing lap. A suitable finish is thus given to the front surface of the contact lens so that it becomes optically clear, transparent and shiny.

The procedures thus far described are rotational and it will be understood that all of the procedures employed in making or forming the front surface of the contact lens are similarly rotational.

Prior to the present invention, when a lens maker desired to examine the contact lens being operated upon for its optical power and to determine the result of the previous operational steps, it was necessary to dismount or "unmount" the contact lens and to remove or clean out the adhesive or pitch used in mounting the lens from its inside surface. The operator then examined the lens to see that it was transparent and free from scratches and "jumps" and of the correct power as determined by the use of a lensometer.

As a matter of practice this stage of the work of making a plastic contact lens has always been found to be particularly troublesome and difficult because of the necessity for removing the adhesive before proper examination of the lens may be made or the lens power determined. Furthermore, in carrying out additional procedural steps in accordance with the findings after the examination of the lens, it was necessary to remount the lens on the same axis insofar as is possible. As a matter of practice, when the lens was remounted by the use of additional adhesive there was generally a slight error in remounting and a corresponding error was introduced in the lens in the subsequent operations thereon.

Making a plastic contact lens of good optical properties in accordance with the power requirements is substantially never achieved on the first trial and the lens must be perfected in subsequent perfecting operations with frequent examinations and checking of the optical power, if, upon examination, the lens has proved to be slightly imperfect, further work upon the surface usually results in an unpreventable change in the lens power, that is, a change in the radius of curvature of the lens. It then becomes necessary to carry out additional operations to restore the correct power, which in turn may modify the fine qualities of the lens operated upon. By thus remounting the lens time after time in order to perfect it, slight errors were introduced which could heretofore not be avoided.

It is a principal object of this invention to provide a method for carrying out machining, polishing and other operations without having to dismount the contact lens from its mount during examination of the lens to determine the result of the operations and the resulting optical power of the lens. With this and other objects which will appear hereinafter, the invention comprises the various features hereinafter described and more particularly defined in the claims.

Referring to the accompanying drawing in connection with which the invention is described in detail:

Figure 1:
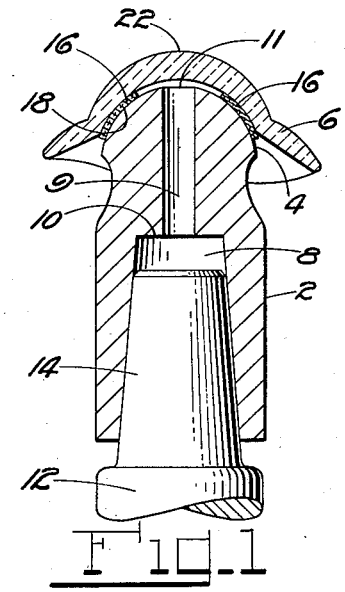
Fig. 1 is a view in elevation, partly in section, showing a rough-blanked, or partially completed contact lens mounted by means of adhesive on a lens mount.
Figure 2:
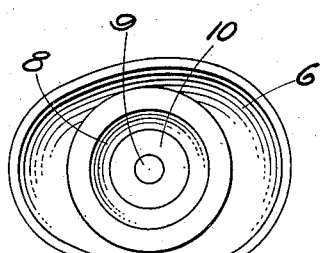
Fig. 2 is a detailed plan view of the mount and contact lens thereon removed from the supporting spindle, the view being taken from below the mount in Fig. 1 looking upwardly toward the underside of the contact lens.
Figure 3:
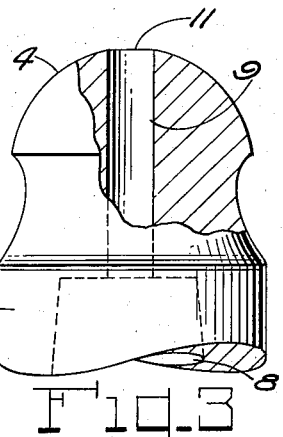
Fig. 3 is a view in elevation, partly in section, of the upper portion of the lens mount, the contact lens and adhesive being removed from the surface of the mount, the part being shown on an enlarged scale.

In the drawing, 2 designates a generally cylindrical sleeve member having a convex and preferably a spherical upper mounting surface 4 on which a plastic contact lens blank 6 is mounted. The sleeve 2 is provided with a lower interior tapered space or opening 8 in the form of a truncated cone and an upper opening 9 extending axially through the mount from the upper face 10 of the conical opening to the central portion of the upper spherical face 4, merging therein in the peripheral line 11. The said upper opening 9 is preferably cylindrical in form through the body of the mount to the face 10 of the truncated cone space 8, but may be made elliptical or other form in cross section, if desired. It will be understood also that the space 8 and the opening 9 may be merged so as to form a continuous tapering surface, although the form shown is preferred for the reason that it may be readily made by drilling the axial opening 9 in mounts of the form now commercially manufactured.

The opening or aperture 9 may also be described as a transparent area or zone, as it is designed as a means for "sighting" the lens, and so may be filled with either a transparent gas (air) or a transparent solid.

The lower tapered opening 8 as shown in Fig. 1 is adapted to be attached to a tapered spindle 12 connected to a motor or other device so as to be turned and operated in the manner explained in detail in my Patent No. 2,237,744 in connection with the corresponding spindle designated as 42 therein.

The tapered spindle 12 is provided with an upward sloping portion 14 adapted to fit the opening 8 of any one of a series of mounts similar to the mount 2 for supporting and holding in place contact lenses of varying sizes. The spherical face or upper lens supporting surface 4 may be varied according to the varying inside curves of the corneal portions of the various lenses or contact lens blanks to be operated upon. In some instances, when a large supporting or gripping surface is not required, the surface 4 may be reduced in size to form an annular support with a convexly curved peripheral margin. This is particularly true when the walls of the mount are thin in section.

In order to hold the contact lens 6 on the mount 4 continuously during the various operations to be carried out on the lens, the lens is preferably mounted on the spherical surface 4 of the mounting member 2 by means of an adhesive 16, which is placed on the surface 4 in a spherical zone 18 which is separated a substantial distance from the periphery 11 of the opening 9, as indicated in Fig. 1. The adhesive material 16 employed for this purpose is preferably a wax, pitch, or gum having the desired adhesive power and other characteristics adapted to hold the contact lens blank 6 firmly and rigidly in place on the spherical surface 4 without sliding or displacement and is adapted to withstand the thrust or force exerted against the lens during the cutting, grinding, polishing or other finishing operations without permitting it to change its position on the supporting surface 4.

The continuous open space 8, 9 provided in the vicinity of the optical area 22 or corneal portion of the lens provides means through which the lens maker may see and examine the corneal portion of the lens without dismounting the lens during the course of carrying out various operations thereon. A mount is provided whose convex supporting surface has a central transparent space or opening in which there is no contact with the lens, and the space or opening is not blocked by the mount itself, so that it allows light to pass through the lens without obstruction. With this device, the operator or lens maker may remove the mount 2 with the lens 6 attached thereto from the lathe spindle 12, or whatever apparatus is motivating it for rotation, and examine the lens to see how the particular operation is progressing by holding the mount 4 in axial alinement with a source of light and with his eye. By facing a window in daylight, for example, the operator may look through the opening 8, 9 and the transparent lens and so observe the corneal part of the lens along the common axis of rotation and vision. Thus he can clearly observe the results as the operation is being progressivey carried out. It will be best if the aperture 9 provided in the head of the mount will be at the center or central portion of the lens, or will be concentric at least with the corneal lens portion however large the clear space or opening may be. With this construction and arrangement it is possible to read the exposed area of the corneal portion of the lens for power in the lensometer by placing the lens and mount affixed thereto over the reading finder of the lensometer.

It is therefore possible by means of the present invention, which provide a means for permitting the passage of light through the lens essentially along or slightly oblique to its axis, to examine the mounted contact lens at will during the various stages of polishing and finishing without removing the lens from its mount or while the lens or contact lens blank remains mounted on the mounting member.

Figure 4:
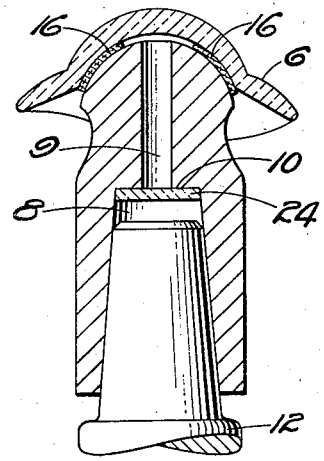
Fig. 4 is a view similar to Fig. 1 showing a modified form of lens mounting.
Figure 5:
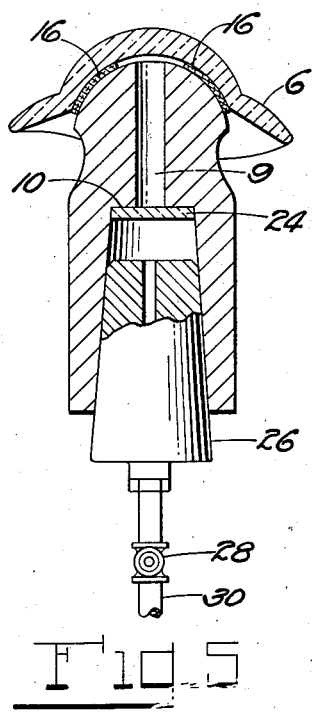
Fig. 5 is a view similar to Fig. 4 showing suction means.

As heretofore explained, "adhesion" is defined as including both the use of suction and the use of an adhesive material. When suction is employed, a small transparent disc 24 may be placed in the aperture 8 as shown in Fig. 4. Then the air may be exhausted by placing a plug 26 shaped like the spindle 12 in the tapered aperture 8 and drawing the air through a valve 28 is an air suction line 30. Any suitable exhausting apparatus may be used. When a partial vacuum is created in the apertures 8 and 9, the mount is held in inverted position with the lens downward and air is again admitted to force the disc, which is held by gravity against the surface 10, tightly enough against the opening into aperture 9 to retain the partial vacuum created therein. The mount is then placed on spindle 12, as shown in Fig. 4, with the lens held tightly due to the partial vacuum in the bore 9. When it is time for an inspection or test, the mount 2 is removed, and the lens is sighted as before, the transparent disc 24 permitting light to pass. When the lens is to be released, the mount is tilted upright and the air exhausted again from the chamber 8, and the disc is allowed to fall against the plug 26. Air is then admitted to chamber 8, and passes into opening 9 to release the lens.

If an adhesive material is used, and suction is not necessary, the disc 24 may be secured in place. It does not interfere with the ability of the aperture 9 to transmit light, and prevents adhesive or other matter from falling down on the spindle.

Figure 6:
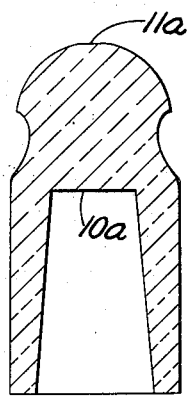
Fig. 6 is a vertical section of a modified form of the lens mount of Fig. 1.

It will be understood that various changes or modifications may be made in the mounting member and method involved in its use as above described without departing from the spirit and scope of the invention. For example, the element 24, when not used to enable suction mounting, need not be the same shape or size, but can extend into the opening 9 in the form of a plug. Likewise, the mount 2 may be made of glass, and the surfaces 11a and 10a made optically polished and flat as shown in Fig. 6, in which case the whole mount can serve as a view piece, the optically polished parts 10a and 11a serving the same purpose as the aperture 9 of the metal mount of Fig. 1. It is also possible to make the mount relatively small with respect to the spindle, so that it is hardly more than an annular supporting surface.

From the foregoing it is apparent that, while many slight structural changes are permissible, the important fact is that a mount is used which is capable of transmitting light along the axis of rotation and the axis of the corneal part of the lens, and that the lens can, therefore, be alternately and repeatedly worked and examined without the necessity for dismounting it from the support used during handling and working.

This application is a continuation-in-part of my previously filed application Serial No. 645,645, filed February 5, 1946, now abandoned.

I claim:

1. The method of carrying out various operations such as machining, polishing and other operational procedures on a plastic contact lens having a corneal portion and a scleral portion to provide the required final corneal lens power without having to dismount or otherwise disturb the mounting of said plastic contact lens which comprises attaching the underside of the contact lens by means of adhesion to a lens mount having a transparent area extending axially therethrough so as to visually expose the central part at least of said corneal portion for examination through said mount, mounting the attached contact lens and mount for rotation on rotating means and performing an operational procedure on said corneal portion of the contact lens, removing the said attached contact lens and mount from the rotating means, examining the optical properties of said corneal portion of the contact lens through said transparent area without dismounting the contact lens from its mount and continuing the cycle of operational procedures and testing until the required final lens power is obtained.

2. The method of carrying out various manufacturing operations, as machining, polishing and other operational procedures, on a plastic contact lens having a corneal portion and a scleral portion to provide the required final corneal lens power without having to dismount or otherwise disturb the mounting of said plastic contact lens which comprises attaching the said plastic contact lens to an axially apertured mount at the underside of the contact lens by means of adhesion so as to visually expose the central portion of said corneal portion for examination through said apertured portion of the mount, mounting the attached contact lens and mount on a spindle for rotation and performing an operational procedure on said corneal portion of the contact lens, removing the said attached contact lens and mount from the spindle, examining the optical properties of said corneal portion of the contact lens through said aperture without dismounting the contact lens from its mount and continuing the cycle of operational procedures and testing until the required final lens power is obtained.

3. The method of carrying out various manufacturing operations, as machining, polishing and other operational procedures, on a plastic contact lens having a corneal portion and a scleral portion to provide the required final corneal lens power without having to dismount or otherwise disturb the mounting of said plastic contact lens which comprises attaching the said plastic contact lens to an axially apertured mount at the underside of the contact lens by means of adhesive material encircling said apertured portion of the mount in an annular zone so as to visually expose the central portion of said corneal portion for examination through said apertured portion of the mount, mounting the attached contact lens and mount on a spindle for rotation and performing an operational procedure on said corneal portion of the contact lens, removing the said attached contact lens and mount from the spindle, examining the optical power of said corneal portion of the contact lens through said aperture without dismounting the contact lens from its mount and continuing the cycle of operational procedures and testing until the required final lens power is obtained.

4. The method of carrying out various manufacturing operations, as machining, polishing and other operation procedures, on a plastic contact lens material to provide the required final lens power without having to dismount or otherwise disturb the mounting of said lens which comprises attaching the said plastic contact lens material to a mount at the underside of the contact lens material in an annular zone at the base of the corneal portion thereof, said mount having a convexly curved mounting surface portion and apertured sleeve portion, said sleeve portion having an opening extending axially therethrough to said mounting surface portion to permit viewing the said corneal portion therethrough, mounting said combined lens and mount for axial rotation by rotating mechanism and performing an operational procedure on the lens, removing the said combined lens and mount from said rotating mechanisms, examining the optical power of said corneal portion of the contact lens through said opening without dismounting the lens from its mount and continuing the cycle of operational procedures and testing until the required final lens power is obtained.

5. The method of carrying out various manufacturing operations, as machining, polishing and other operational procedures on a plastic contact lens to provide the required final lens power without having to dismount or otherwise disturb the mounting of said contact lens which comprises attaching by means of adhesive material the said plastic contact lens material to a mount at the underside of the contact lens in an annular zone at the base of the corneal portion thereof, said mount having an upper convex mounting surface portion and an apertured sleeve portion having an opening extending axially therethrough to said mounting surface portion to permit viewing the said corneal portion therethrough, mounting said combined lens and mount on a spindle for rotation, rotating said mount and performing an operational procedure on the lens, removing the said combined lens and mount from said spindle without disturbing the fixed position of the lens on the mount, examining the optical power of the said corneal portion of the contact lens through said opening without dismounting the lens from its mount, remounting the said combined lens and mount on the spindle and continuing the cycle of operational procedures and testing until the required final lens power is obtained.

6. The method of carrying out various manufacturing operations, as machining, polishing and other operational procedures, on a plastic contact lens to provide the required final lens power without having to dismount or otherwise disturb the mounting of said plastic contact lens which comprises attaching the said plastic contact lens material to a mount by means of suction to cause adhesion at the underside of the contact lens in an annular zone at the base of the corneal portion of the contact lens, said mount having an upper convex spherical mounting surface portion having an opening extending axially therethrough to said spherical mounting surface portion to permit viewing the said corneal portion therethrough, mounting said combined lens and mount on a spindle for rotation, rotating said mount and performing an operational procedure on the corneal lens, removing the said combined lens and mount from said spindle without disturbing the fixed position of the lens on the mount, examining the optical power of said corneal portion of the contact lens through said opening without dismounting the lens from its mount, remounting the said combined lens and mount on the spindle and continuing the cycle of operational procedures and testing until the required final lens power is obtained.

JOHN E. MULLEN.